Patented July 27, 1926.

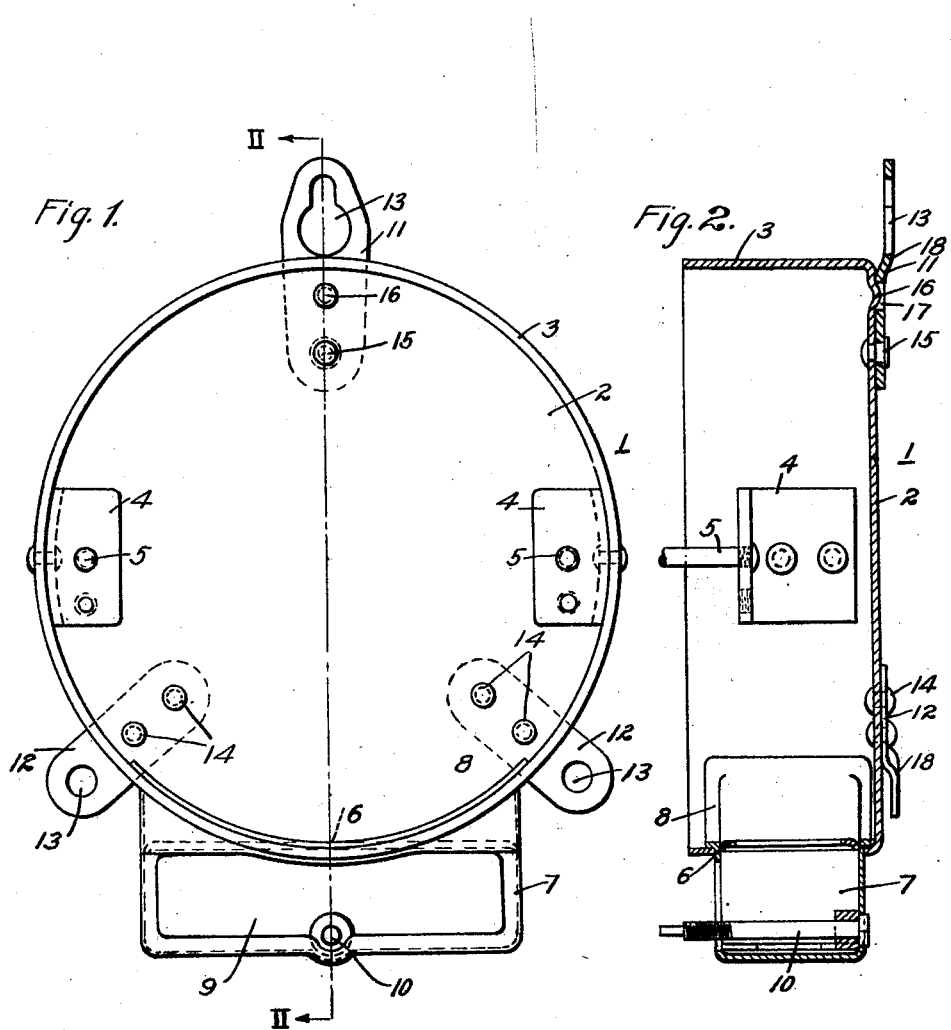

1,594,184

UNITED STATES PATENT OFFICE.

WALTER G. MYLIUS, OF WILKINSBURG, PENNSYLVANIA, ASSIGNOR TO WESTINGHOUSE ELECTRIC & MANUFACTURING COMPANY, A CORPORATION OF PENNSYLVANIA.

METER CASE.

Application filed February 20, 1922. Serial No. 538,132.

My invention relates to meter cases and it has particular relation to watthour meter cases constructed of sheet metal.

One of the objects of my invention is to provide a device of the character described that shall be of relatively light weight, attractive in appearance and that may be manufactured at small expense and with comparatively few dies or forming tools.

Another object of my invention is to provide a meter case having a plurality of supporting brackets that are adapted to rest firmly against the wall or other structure to prevent the case from tilting or rocking with respect thereto and disturbing the adjustment or operation of the delicate mechanism thereof, and at the same time to provide an air space between the back portion thereof and a supporting structure to avoid dampness.

Heretofore, it has been customary to construct meter cases of this general character of cast metal. A casing so constructed was relatively heavy, easily broken and required a large amount of metal. Furthermore, the rough casting required a certain amount of grinding and polishing which materially added to its cost.

In the accompanying drawings,

Figure 1 is a front elevational view of a sheet metal meter case constructed in accordance with my invention.

Fig. 2 is a vertical longitudinal sectional view taken on line II—II of Fig. 1.

Referring to the drawing, a watthour meter case is shown as comprising a main body portion 1 adapted to contain the meter mechanism and having a back-portion 2 and an annular wall 3. The portion 1 is preferably formed of a pressed sheet metal integral unit and is open at the front for access to the interior thereof.

A plurality of diametrically disposed bracket members 4 are suitably secured to the wall 3 of the case and constitute supports for the meter mechanism. Rods 5 are mounted in the brackets 4 and are adapted to engage the cover of the meter, not shown.

The lower portion of the wall 3 of the meter case 1 is cut away, as at 6, for the reception of a terminal box 7, which is welded in position and open at its upper portion for communication with the interior of the casing 1. The terminal box 7 is also of pressed metal unitary structure and is provided, adjacent to its upper edge, with an outwardly extending arcuate flange 8 having a radius of curvature equal to that of the wall 3 and is adapted to engage the wall 3 of the case 1 adjacent to the opening 6 therein to constitute the support for the box 7.

An aperture 9 is provided in the front wall of the terminal box 7 through which access may be obtained to the usual connections between the line and the meter. A lock rod 10, of usual structure, is suitably secured within the terminal box 7 and is adapted to retain a suitable cover, not shown, in closed position over the aperture 9 to exclude dust and moisture therefrom, and to also prevent unauthorized tampering or interference with the terminal connections.

From the foregoing it will be apparent that by my improved construction there is provided a meter case of attractive appearance that will rest firmly against the wall and one that may be quickly and easily manufactured and assembled at relatively small expense.

The casing is supported upon a wall or other structure by means of upper and lower radially extending brackets 11 and 12, respectively, which are suitably secured to the back 2 thereof and which are each provided with apertures 13 adapted to receive supporting screws, not shown. The lower brackets 12 are preferably rigidly secured to the back 2 of the casing 1 by means of rivets 14, but the upper bracket 11 is pivotally mounted thereon by means of a shoulder rivet 15 so that it may be swung around into a position within the outline of the case and in which it will not project beyond the casing, for the purpose of facilitating packing the case for shipment.

The bracket 11 is yieldably maintained in its outwardly projecting or operative position by means of an extruded portion 16 formed on the back 2 of the case, which is adapted to register with and extend into an aperture 17 provided in the bracket 11. The inherent resiliency of the various parts, together with a certain amount of lost motion or play existing therebetween, permits the bracket to be manually forced about its pivotal connection to disengage the aperture 17 from the extrusion 16, thereby providing a yieldable slip or snap holding or position-accentuating means between the casing and bracket.

Each of the brackets 11 and 12 are formed with offset portions 18, by means of which the upper portions thereof may rest solidly against a wall or other supporting structure with the rivets 14 and 15 out of contact therewith, and to also provide an air space between the back of the case and the supporting structure whereby the meter case and mechanism contained therein may be maintained as free from dampness as is possible.

I claim as my invention:

1. A meter-enclosure structure comprising a meter-compartment casing having an opening in a wall thereof and a terminal housing having an open side disposed adjacent to, and around, said opening for communication therewith, said casing and housing having laterally co-operating adjacent parts for holding the same together and preventing outward withdrawal of the housing from the casing.

2. A meter-enclosure structure comprising a meter-compartment casing having an opening in a wall thereof, a terminal housing having an open side disposed within said opening and means for holding the casing and housing together.

3. A meter-enclosure structure comprising a meter-compartment casing having an opening in a wall thereof, a terminal housing having an open side disposed within said opening and means inside the casing for holding the casing and housing together.

4. A pressed metal case having an aperture in the wall thereof, a terminal housing mounted adjacent to said aperture for communication with said casing, said housing having a flange adapted to engage the wall of said case adjacent to said aperture to form a support for said housing.

5. A pressed metal meter case of substantially cup-shape having an aperture in the wall thereof, a terminal housing mounted in said aperture for communication with said case, said housing having arcuate flanges adapted to engage the wall of said case and conforming with the curvature thereof.

6. A meter casing having an aperture in a wall thereof, a terminal housing disposed adjacent to said aperture for communication with the casing, said housing having laterally-outwardly-extending portions in the casing over-lapping edges of the casing around the aperture.

7. The combination with a meter casing, of a supporting member, means securing the member to the casing for movement between positions wholly within and partially without, bounding outlines thereof, and snap holding means for maintaining the supporting member in one of said positions.

8. The combination with a meter casing, of a supporting member opposite the rear wall thereof, and means securing the member to said rear wall for movement between positions wholly within, and partially without, the outlines of the side walls of the casing, and means co-operating between the casing and the supporting member for holding the supporting member in one of said positions.

9. The combination with a meter casing, of a supporting member opposite the rear wall thereof, and means securing the member to said rear wall for movement between positions wholly within, and partially without, the outlines of the side walls of the casing and means extending between the casing and the supporting member for holding the latter in one of said positions.

10. A meter case comprising a body member, and a supporing bracket member pivotally mounted thereon and having a portion adapted to be selectively moved to relative positions exterior to and within the outline thereof, said members being constructed and one thereof having a recess and the other a projecting portion for co-operation with said recess to yieldably maintain said bracket member and case member in one of said relative positions.

11. A meter case comprising a body portion, a supporting bracket pivotally mounted thereon adapted to be selectively moved to positions exterior to and within the outline thereof, an extruded portion formed on said body portion adapted to be engaged by said bracket to yieldably maintain said bracket in a position exterior to the outline of said case.

12. A meter case comprising a body portion, a supporting bracket pivotally mounted thereon and adapted to be selectively moved to an operative position exterior to the outline of said case and to an inoperative position within the outline thereof, said supporting bracket having an aperture therein adapted to engage an extruded portion formed on said body portion to yieldably maintain said bracket in operative position.

13. A meter case comprising a body portion, a supporting bracket pivotally mounted thereon and adapted to be selectively moved to an operative position exterior to the outline of said case and to an inoperative position within the outline thereof, said supporting bracket being offset with respect to said body portion to maintain said case in spaced relation with respect to a supporting structure and having an aperture therein adapted to engage an extruded portion formed on said body portion to yieldably maintain said bracket in operative position.

In testimony whereof, I have hereunto subscribed my name this 8th day of February 1922.

WALTER G. MYLIUS.